US009189424B2

(12) United States Patent
Gaither et al.

(10) Patent No.: US 9,189,424 B2
(45) Date of Patent: Nov. 17, 2015

(54) EXTERNAL CACHE OPERATION BASED ON CLEAN CASTOUT MESSAGES

(75) Inventors: Blaine D Gaither, Fort Collins, CO (US); David A Plettner, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 692 days.

(21) Appl. No.: 13/149,493

(22) Filed: May 31, 2011

(65) Prior Publication Data

US 2012/0311267 A1    Dec. 6, 2012

(51) Int. Cl.
*G06F 12/08*    (2006.01)
*G06F 12/12*    (2006.01)

(52) U.S. Cl.
CPC .......... *G06F 12/128* (2013.01); *G06F 12/0802* (2013.01); *G06F 12/12* (2013.01)

(58) Field of Classification Search
CPC ....... G06F 11/10; G06F 11/073; G06F 12/12; G06F 12/121; G06F 12/0893; G06F 12/0815; G06F 12/073; G06F 12/0811; G06F 12/0866; G06F 2003/0697; G06F 2009/45579
USPC ......... 711/122, 144, 141, 118, 145, 146, 130, 711/E12.017, E12.024, E12.026, E12.019, 711/119, 135, E12, 22, E12.038, E12.041, 711/E12.069, E12.07, 100, 123, 126, 140
See application file for complete search history.

(56) References Cited

U.S. PATENT DOCUMENTS

| | | | |
|---|---|---|---|
| 5,551,001 A * | 8/1996 | Cohen et al. .................. 711/122 |
| 6,338,120 B1 * | 1/2002 | Hanley .......................... 711/136 |
| 6,370,618 B1 | 4/2002 | Arimilli et al. |
| 6,397,302 B1 * | 5/2002 | Razdan et al. ................. 711/141 |
| 6,408,362 B1 | 6/2002 | Arimilli et al. |
| 6,721,856 B1 * | 4/2004 | Arimilli et al. ............... 711/146 |
| 6,922,756 B2 * | 7/2005 | Hum et al. ..................... 711/145 |
| 7,177,986 B2 * | 2/2007 | Rowlands et al. ............ 711/144 |
| 7,472,225 B2 * | 12/2008 | Varma et al. .................. 711/122 |
| 7,600,143 B1 * | 10/2009 | Neuman ........................ 713/500 |
| 7,711,905 B2 | 5/2010 | Flemming et al. |
| 8,060,700 B1 * | 11/2011 | Glasco et al. ................. 711/133 |
| 8,117,395 B1 * | 2/2012 | Rohana et al. ................ 711/128 |
| 8,176,255 B2 * | 5/2012 | Knebel .......................... 711/128 |
| 2002/0044550 A1 * | 4/2002 | Keller ............................ 370/386 |
| 2002/0065992 A1 * | 5/2002 | Chauvel et al. ............... 711/141 |
| 2002/0156962 A1 * | 10/2002 | Chopra et al. .................... 711/3 |
| 2003/0009643 A1 * | 1/2003 | Arimilli et al. ............... 711/155 |
| 2005/0138292 A1 * | 6/2005 | Sullivan ........................ 711/122 |
| 2005/0160235 A1 * | 7/2005 | Steely et al. .................. 711/144 |
| 2005/0160237 A1 * | 7/2005 | Tierney et al. ................ 711/145 |
| 2005/0268046 A1 * | 12/2005 | Heil ............................... 711/137 |
| 2006/0117148 A1 * | 6/2006 | Liu et al. ....................... 711/146 |
| 2006/0143396 A1 * | 6/2006 | Cabot ............................ 711/134 |
| 2007/0136535 A1 * | 6/2007 | Rajamony et al. ............ 711/143 |

OTHER PUBLICATIONS

Thomasdakis et al. The Architecture of the Nehalem Processor and Nehalem-EP SMP Platforms Supercomputing Facility miket AT tame DOT edu Texas A&M University Jan. 11, 2011, 50 pages.

* cited by examiner

*Primary Examiner* — Tuan Thai
*Assistant Examiner* — Edward Waddy, Jr.
(74) *Attorney, Agent, or Firm* — Hewlett-Packard Patent Department

(57) ABSTRACT

A processor transmits clean castout messages indicating that a cache line is not dirty and is no longer being stored by a lowest level cache of the processor. An external cache receives the clean castout messages and manages cache lines based in part on the clean castout messages.

12 Claims, 6 Drawing Sheets

EXTERNAL CACHE OPERATION BASED ON CLEAN CASTOUT MESSAGES

BACKGROUND

In the art of computing, cache memories are used to provide faster access to memory contents. Typically, a cache memory is architecturally positioned between main memory and devices that require access to the contents of the main memory, such as the execution units of a processor. By caching memory contents in faster memories that are closer to the consuming devices, overall data access latencies are reduced.

It is known to have different levels of caches, with levels that are closer to the consuming device tending to have faster and smaller memories. If a cache memory is provided in the same package as the consuming device, the cache memory is known in the art as an internal cache memory. If the cache memory is external to the package, the cache memory is known in the art as an external cache memory.

BRIEF DESCRIPTION OF THE DRAWINGS

The Figures depict examples, implementations, and configurations.

DETAILED DESCRIPTION

Figure 1:
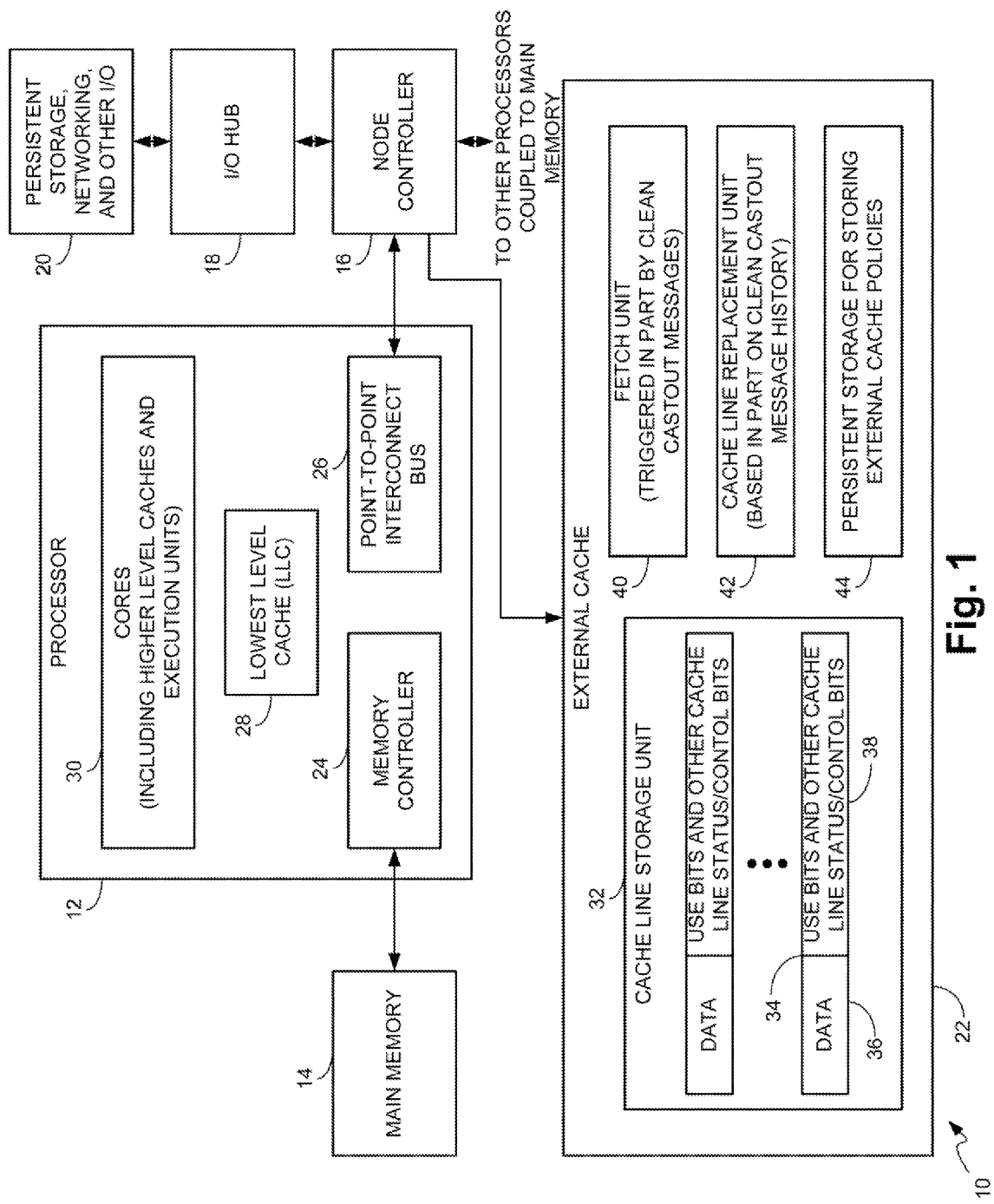
FIG. 1 shows a computer system that uses clean castout messages to augment operation of an external cache.

In the foregoing description, numerous details are set forth to provide an understanding of the examples. However, it will be understood by those skilled in the art that the examples may be practiced without these details. While a limited number of examples have been disclosed, those skilled in the art will appreciate numerous modifications and variations therefrom.

Examples relate to external cache memories that speculatively fetch and replace cache lines by monitoring clean castout messages from processors.

As the art of computing has evolved, cache memories have tended to transition from external to internal. For example, the Intel 80386 processor did not have an internal cache, and implementations based on this processor often implemented a single level, external cache. The Intel 80486 processor included 8-kB level 1 (L1) cache memory in the processor die, and implementations using this processor often included an external level 2 (L2) cache. More recently, processors based on Intel's Nehalem microarchitecture support up to 10 cores and three levels of cache memory, with a 64 KB L1 cache (a 32 KB L1 data cache and a 32 KB L1 instruction cache) and a 256 KB L2 cache for each core. A level 3 (L3) cache is shared by all cores on the processor die and may be as large as 30 MB. In general, the slowest and largest cache on the processor die is referred to as the lowest level cache (LLC).

Typically, multi-level cache memories are implemented using an either an inclusive or exclusive configuration. In an inclusive configuration, all cache lines cached in higher level caches are also cached in lower level caches. In an exclusive configuration, only a single copy of the cache line exists in all cache levels. For a given set of cache memories, the exclusive configuration has the advantage of providing more cache line storage. However, as cache lines are evicted out of higher level caches they tend to migrate to lower level caches, so managing an exclusive cache configuration is more complex. Modern processors produced by Intel Corporation tend to have inclusive cache memories, and modern processors produced by Advanced Micro Devices, Incorporated (AMD), tend to have exclusive cache memories.

Another recent trend in the art of computing is to integrate memory controllers in the processor die. The integrated memory controllers generate the signals that go to the main memory modules. One consequence of this trend is that each processor has its own main memory. Collectively, all the main memory modules coupled to all the processors form the total main memory pool of a computer system. However, a processor can access its own main memory much faster than the main memory coupled to another processor. Typically, point-to-point interconnects such as Intel's QuickPath Interconnect (QPI) or the HyperTransport interconnect promoted by the HyperTransport Consortium are used to couple processors, thereby coupling together the main memories into a single memory pool. Furthermore, a cache coherency protocol is used to ensure that all copies of memory throughout the computer system remain coherent. Such a configuration is known in the art as a cache-coherent non-uniform memory access (ccNUMA) configuration.

The processor that hosts the main memory where needed data is stored is known as the home node, and a copy of that data may be stored in a cache memory of the home node, or cache memories of other nodes. Nodes that have a copy of the cache line but are not the home node may also be referred to as peer nodes.

Modern Intel processors implement a cache coherency protocol known as the MESIF protocol. A series of messages are defined, and the messages are exchanged between agents and nodes to implement the protocol. Note that the terms "agent" and "cacheable agent" will be used to refer to any entity that can cache data, including processors and various input/output (I/O) devices. In theory, a node can lack cache memory and therefore not be a cacheable agent, but in practice, nodes are typically agents.

In accordance with the MESIF protocol, each cached copy of the data from the main memory of the home node may assume one of five states: modified, exclusive, shared, invalid, or forward. The forward state is a shared state, and if several copies of a cache line are being shared, only one is assigned a forward state. When another node requests a copy of the cache line, only the cache line having the forward state responds, with the recipient of the cache line receiving the forward state and the sender reverting to the shared state. By transferring the forward state among commonly shared cache lines, access to the cache line is distributed and cache line access hot spots do not develop at any particular node.

When a processor no longer needs to store a clean (unmodified) copy of a cache line in its LLC, typically there is no need to notify the other agents. Since the data is clean, it does not need to be written back to the home node. The space occupied by the old cache line can simply be reallocated to a new cache line. This is known in the art as a clean castout, and in most cases, there is no reason to signal or acknowledge a clean castout external to the processor.

In accordance with examples, a processor issues a clean castout message when it performs a clean castout and no longer stores a cache line. The clean castout message need not include the cache line data. An external cache receives the clean castout message, and the clean castout message is used to speculatively fetch the cache line into the external cache. Clean castout messages are also used to age cache lines out of the external cache.

When a clean castout message is received, the external cache determines whether it already has a copy of the cache line that is being cast out. If a cache line is being cast out of the processor's LLC, there is a good chance that the processor will need the cache line again. If the external cache does not have a copy of the cache line, the external cache fetches a copy.

If a clean castout message has not been received for a cache line for a period of time, it is possible that the processor needs to access the cache line so frequently that cache line remains in one or more of the processor caches. Conversely, it could also mean that the processor is no longer using the cache line. In either case, the cache line can be allowed to age out of the external cache to allow other cache lines to be stored in the external cache.

FIG. 1 shows a computer system 10 that uses clean castout messages to augment operation of an external cache. Computer system 10 includes a processor 12, main memory 14, node controller 16, I/O hub 18, persistent storage, networking, and other I/O 20, and external cache 22.

Processor 12 includes memory controller 24, point-to-point interconnect bus 26, lowest level cache (LLC) 28, and cores 30, which include higher level caches and execution units. Memory controller 24 is coupled to main memory 14 via a private bus. Typically, the private bus will comprise signals suitable for memory modules, such as chip selects, row strobes, column strobes, and the like. Generally, these private busses are not snoopable by external cache memories. Point-to-point interconnect bus 26 is coupled to node controller 16. Point-to-point interconnect bus may be a QPI bus, a HyperTransport bus, or any other suitable point-to-point bus known in the art.

Note that the depiction of processor 12 is consistent with the Intel Nehalem microarchitecture, but those skilled in the art will recognize that other processors may also be used with the examples described herein. Note that node controller 16 is coupled to other processors, which in turn are coupled to main memory. One may consider these other processors and main memory to be substantially similar to processor 12 and main memory 14. Also note that any device coupled either directly or indirectly to node controller 16 may be considered to be an agent. In FIG. 1, processor 12, external cache 22, I/O hub 18 (and possibly the other devices connected to I/O hub 18 and represented by block 20), and the other processors are all agents.

External cache 22 includes cache line storage unit 32. Cache line storage unit 32 includes cache row entries, such as cache row entry 34. Each cache row entry has a data field, such as data field 36, that stores the contents of a stored cache line, and a field that stores use bits and other cache line status/control bits, such as field 38. The bits stored in field 38 include various cache fields known in the art. For example if external cache 22 is implemented as a set associative cache (which is a very common cache organization), field 38 would include index, tag, and offset fields. Field 38 also includes bits that support cache coherency, such as bits that represent the MESIF states discussed above.

Finally, the use bits are used to support a cache replacement algorithm. For example, a full implementation of a Least Recently Used (LRU) replacement algorithm would rank all cache lines based on usage, and select the cache line that was least recently used for replacement. However, a full implementation of an LRU mechanism is unduly complex. For example, one implementation could use a complex linked list structure to link all rows into a list that is in replacement order. A much simpler mechanism is the Not Recently Used (NRU) algorithm that defines replacement classes based on read and write accesses and aging bits that are set in response to cache line access and are periodically cleared based on a timer.

External cache 22 also includes fetch unit 40 and cache line replacement unit 42, which both use clean castout messages to operate external cache 22. The operation of units 40 and 42 will be described in greater detail below. Finally, external cache 22 includes persistent storage 44, which provides non-transitory persistent storage for storing policies for operating the external cache. The policies may be stored in any form of volatile or non-volatile memory. Note that policies may also be stored elsewhere and loaded into external cache 22 when cache 22 is initialized. Alternatively, the external cache policies may be hard coded into units 40 and 42.

FIGS. 2-5 are state diagrams showing transactions between nodes. To facilitate an understanding of the examples, a simplified set of messages have been defined. The messages below are compatible with or adaptable to many known protocols, such as the MESIF protocol, and may be adaptable to future protocol. Accordingly, the examples below use the following messages:

CCM: Clean Castout Message—This message is sent from a caching node to an external cache when the caching node is no longer storing an unmodified cache line in the LLC of the caching node. The CCM need not contain the cache line data since the external cache will fetch the cache line from a source other than the LLC of the caching node sending the CCM.

RL: Read Line—This message is a request from a caching node to other nodes requesting that a cache line be transmitted to the caching node.

IACK: Invalid Acknowledge—This message is sent in response to an RL message and indicates that the node does not have a copy of the cache line, the copy that the node does have is invalid, or the node has a shared copy but the node does not hold the copy in the forward state. In any event, the responding node will not provide a copy of the requested cache line.

DATA-S and DATA-F—A response to an RL message that includes a copy of the cache line. The DATA-S command instructs the receiving node to hold the cache line in a shared state and the DATA-F command instructs the receiving node to hold the cache line in a forward state.

CNCL: Cancel Cache Line—When a node transmits an RL command, one of the receiving nodes is the home node that holds the cache line in main memory. The home node begins a memory access cycle to retrieve the cache line from main memory, but the memory access cycle has a higher latency than a response from another node that has the cache line in a cache. If the requesting node's RL command has been satisfied by another node, the requesting node sends a CNCL command to the home node so that the home node can cancel the main memory request.

Figure 2:
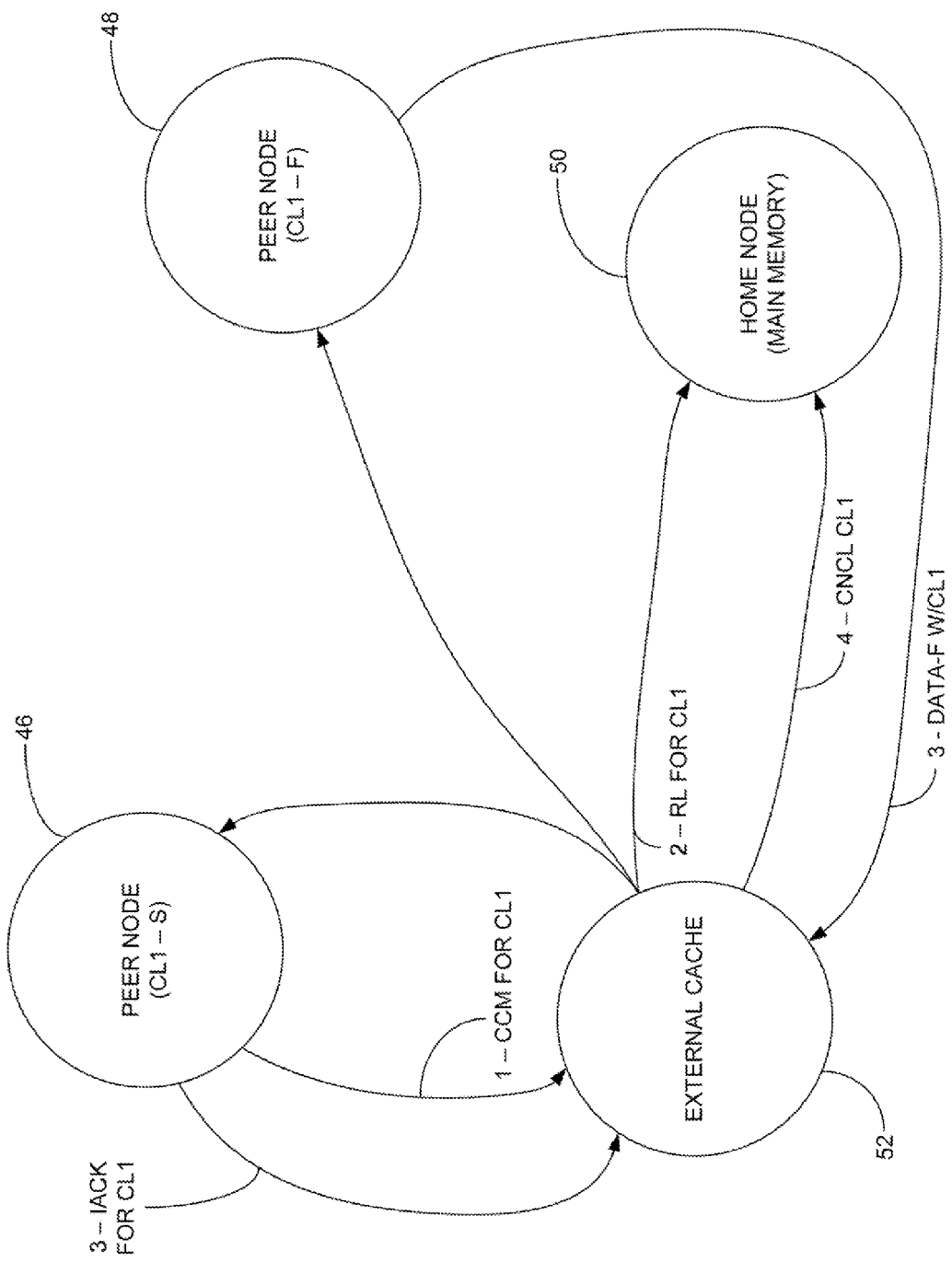
FIGS. 2-5 are state diagrams showing transactions between node agents.

FIG. 2 is a state diagram showing peer nodes 46 and 48, home node 50, and external cache 52. Prior to any coherency transactions, node 46 has a shared copy of cache line 1 (CL1) and node 48 has a shared copy of CL1 designated in the forward state. Home node 50 does not have a copy of CL1 in a cache memory, but does have a copy in its slower main memory. Finally, external cache 52 does not have a copy of CL1.

First, peer node 46 issues a clean castout message (CCM) to external cache 52 indicating that CL1 has not been modified (or alternatively, is not dirty) and will no longer be stored in node 46. Note that in FIG. 2, the CCM message is only sent to external cache 52. In other examples, the CCM message could be sent to other caching agents if the agents would benefit from receiving the message.

Since external cache 52 does not have a copy of CL1, it speculatively fetches a copy by sending a read line (RL) message for CL1 to nodes 46, 48, and 50. Since node 46 is the node that performed the clean castout of CL1 and node 46 is not the home node, node 46 does not have a copy and responds with an IACK message. Home node 50 begins to fetch CL1 from main memory. Finally, peer node 48 responds with a DATA-F message, which provides a copy of CL1 to external cache 52 and instructs external cache 52 to store the cache line with a forward state. Since external cache 52 now has a copy of CL1, external cache 52 sends a cancel cache line (CNCL) message for CL1 to home node 50, which can cancel the request that was initiated to main memory. In another example, if a peer node did not have a copy of CL1, the RL request could have been fulfilled from the main memory of home node 50, although main memory access would have taken considerable longer.

Figure 3:
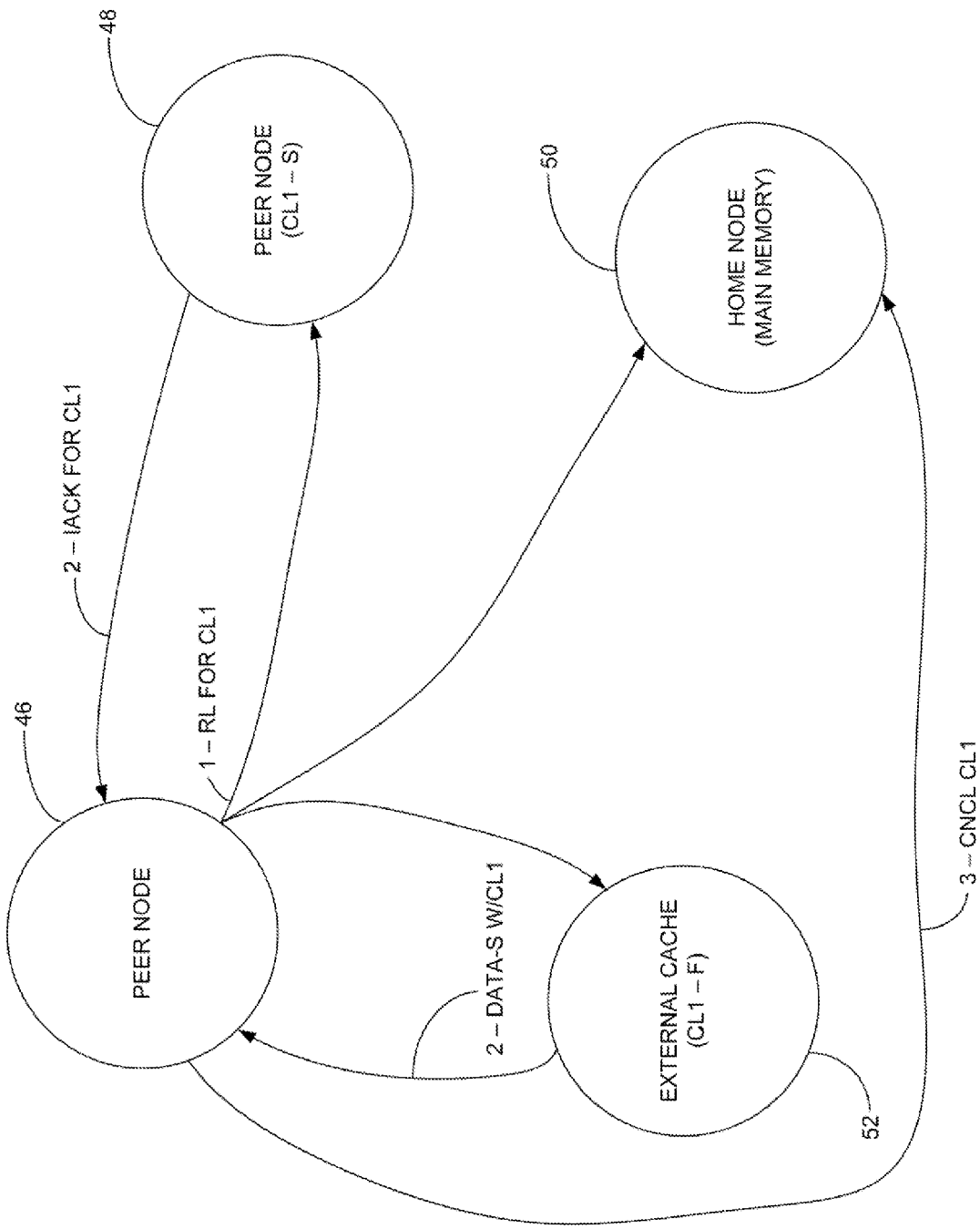

FIG. 3 is a state diagram showing peer nodes 46 and 48, home node 50, and external cache 52 after the coherency transactions of FIG. 2 have completed. In FIG. 3, node 48 retains a copy of the CL1, but the state has switched to shared. Node 46 does not have a copy of CL1 since node 46 performed a clean castout of CL1, and external cache 52 has a copy of CL1 in the forward state as a result of the speculative fetch shown in FIG. 2.

In FIG. 3, assume that node 46 once again needs access to CL1. Node 46 issues an RL message for CL1 to nodes 48 and 50, and external cache 52. Node 48 responds with an IACK message because node 48 has CL1, but not in the forward state. Home node 50 begins fetching CL1 from main memory, and external cache 52 provides CL1 to node 46 using a DATA-S command, which provides a copy of CL1 and instructs node 46 to assign the shared state to CL1. Since the RL request has been satisfied by external cache 52, node 46 sends a CNCL message to home node 50 to cancel the fetch from main memory.

The example shown in FIG. 3 illustrates another feature. As defined by the MESIF protocol, the last node to receive a shared cache line assumes the forward state. As discussed above, shifting the forward state between nodes distributes the access requests and prevents a "hot" cache line from being continuously serviced by one node. However, processor nodes participate in other data transactions that are not serviced by the external cache, such as fetches from main memory and inter-process communications. Accordingly, it may be desirable to continue to shift the forward state between nodes as long as a cache line is not stored in the external cache, but have the external cache retain the forward state for as long as the cache line is retained in the external cache. This feature is illustrated by FIGS. 2 and 3, wherein peer 48 sends the forward state to external cache 52, but external cache 52 does not send the forward state to peer node 46.

Figure 4:
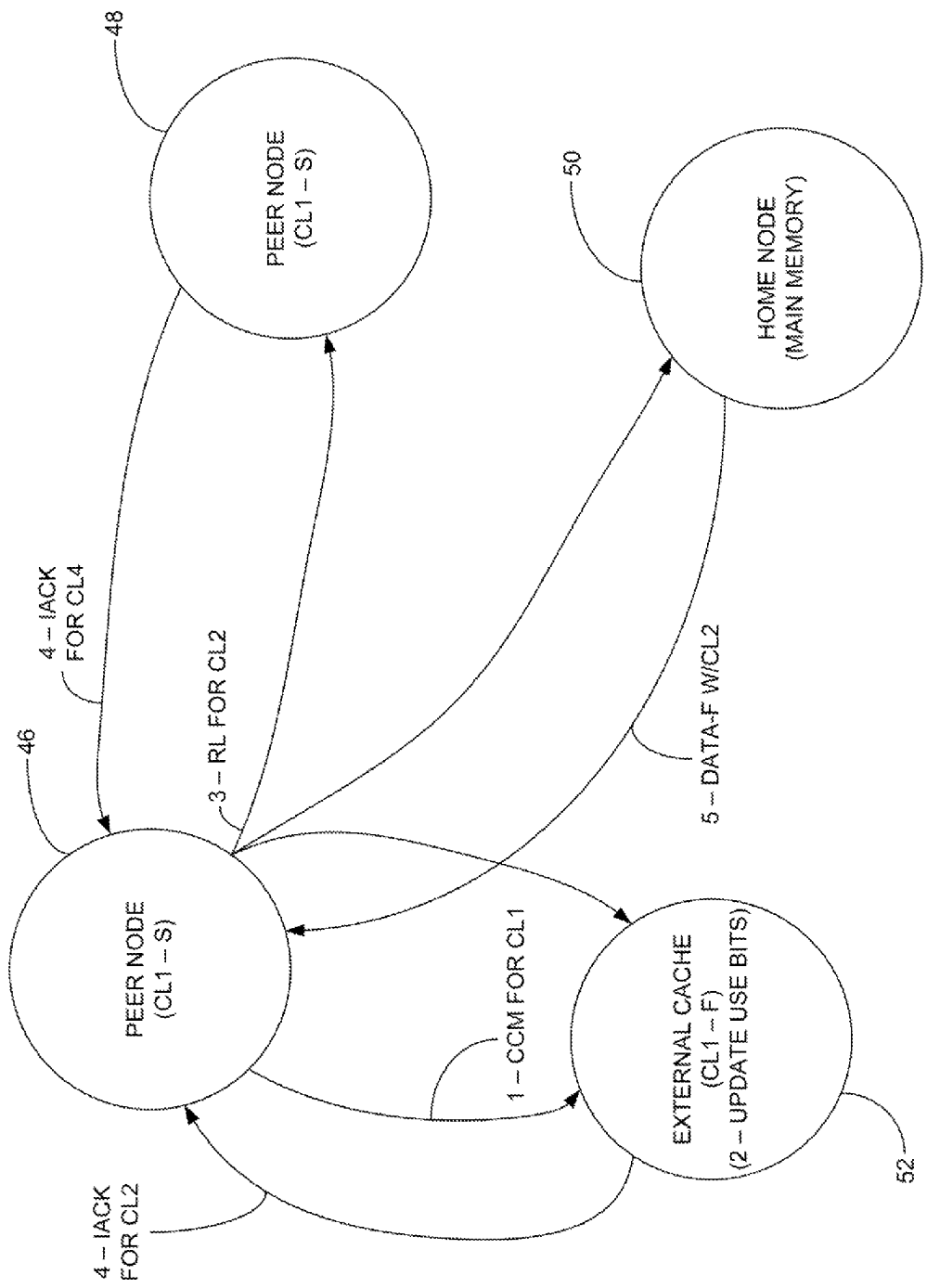

FIG. 4 is a state diagram showing peer nodes 46 and 48, home node 50, and external cache 52 when peer node 46 has a full LLC and seeks to load a new cache line (CL2). In FIG. 4, node 46 first clears a cache line row by casting out CL1 and sending a CCM to external cache 52. In FIG. 4, external cache 52 already has CL1 stored in the forward state, so it is not necessary to speculatively fetch CL1. Accordingly, external cache 52 updates the use bits associated with CL1. Note that one implementation of the Not Recently Used replacement algorithm assigns replacement classes based on combinations of references and modifications. One example treats a received CCM as a reference, and another example treats a received CCM as a modification. Of course, if a Least Recently Used (LRU) replacement algorithm is used, the CCM is simply counted as a use.

Node 46 then issues an RL for CL2. Since CL2 is not cached anywhere, both node 48 and external cache 52 respond with an IACK message. Home node 40 fetches CL2 from main memory, and sends CL2 to node 46 using a DATA-F command.

Figure 5:
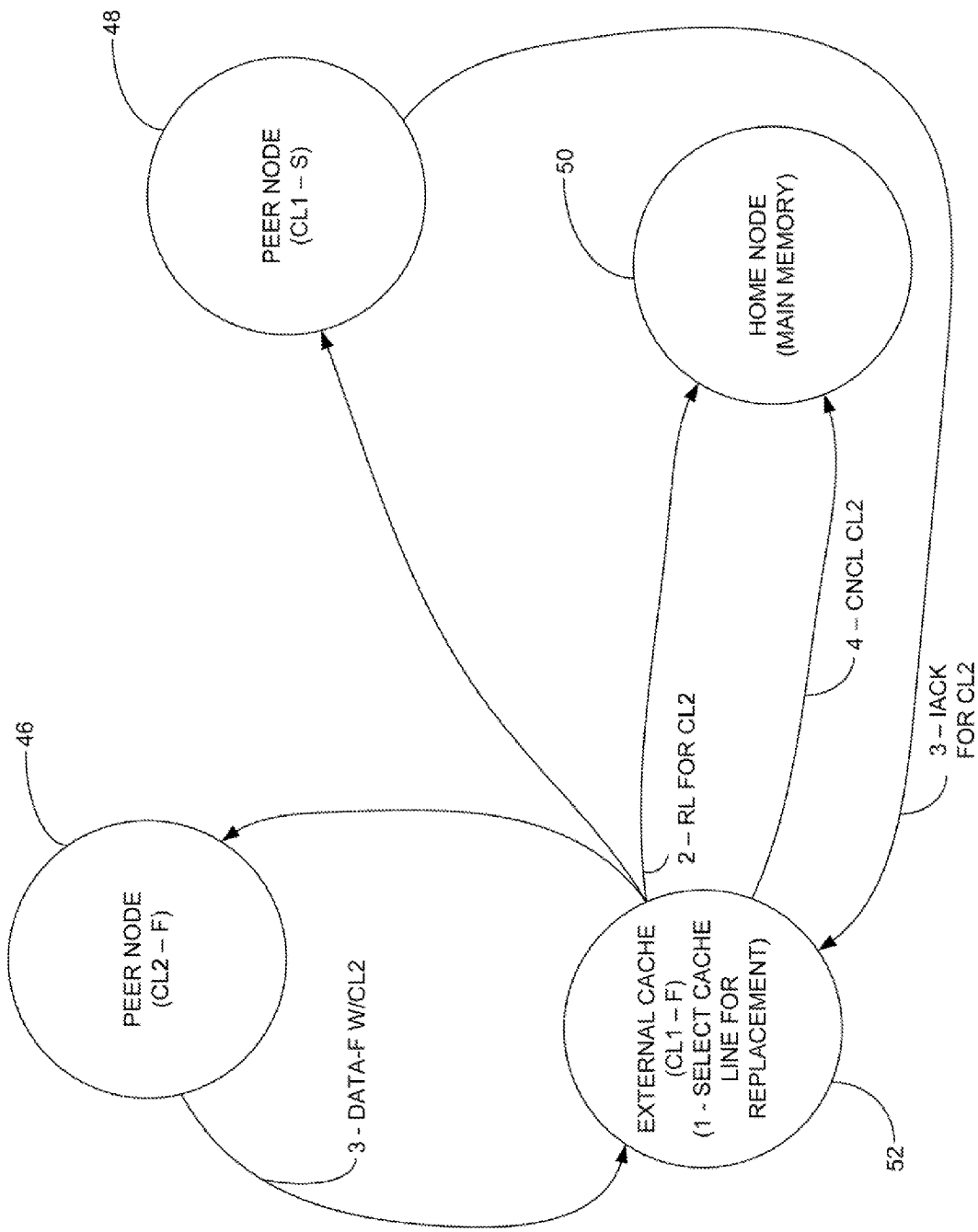

FIG. 5 is a state diagram showing peer nodes 46 and 48, home node 50, and external cache 52 after the transactions of FIG. 4 have completed. In FIG. 4, external cache 52 observed an RL command for CL2, and did not have CL2 cached. Accordingly, external cache 52 speculatively fetches CL2 under the assumption that CL2 may, at some point, be cast out and then needed again.

Assume that external cache 52 is full. A cache line must be selected for replacement, which external cache 52 does with reference to the use bits. As discussed above, the use bits are updated by CCMs. Next, external cache 52 sends an RL for CL2 to peer nodes 46 and 48, and home node 50. Node 48 does not have CL2, so it responds with an IACK message, and node 46 responds with a copy of CL2 in a DATA-F message. Finally, external cache 52 sends a CNCL message to home node 50 to cancel the fetch of CL2 from main memory.

Figure 6:
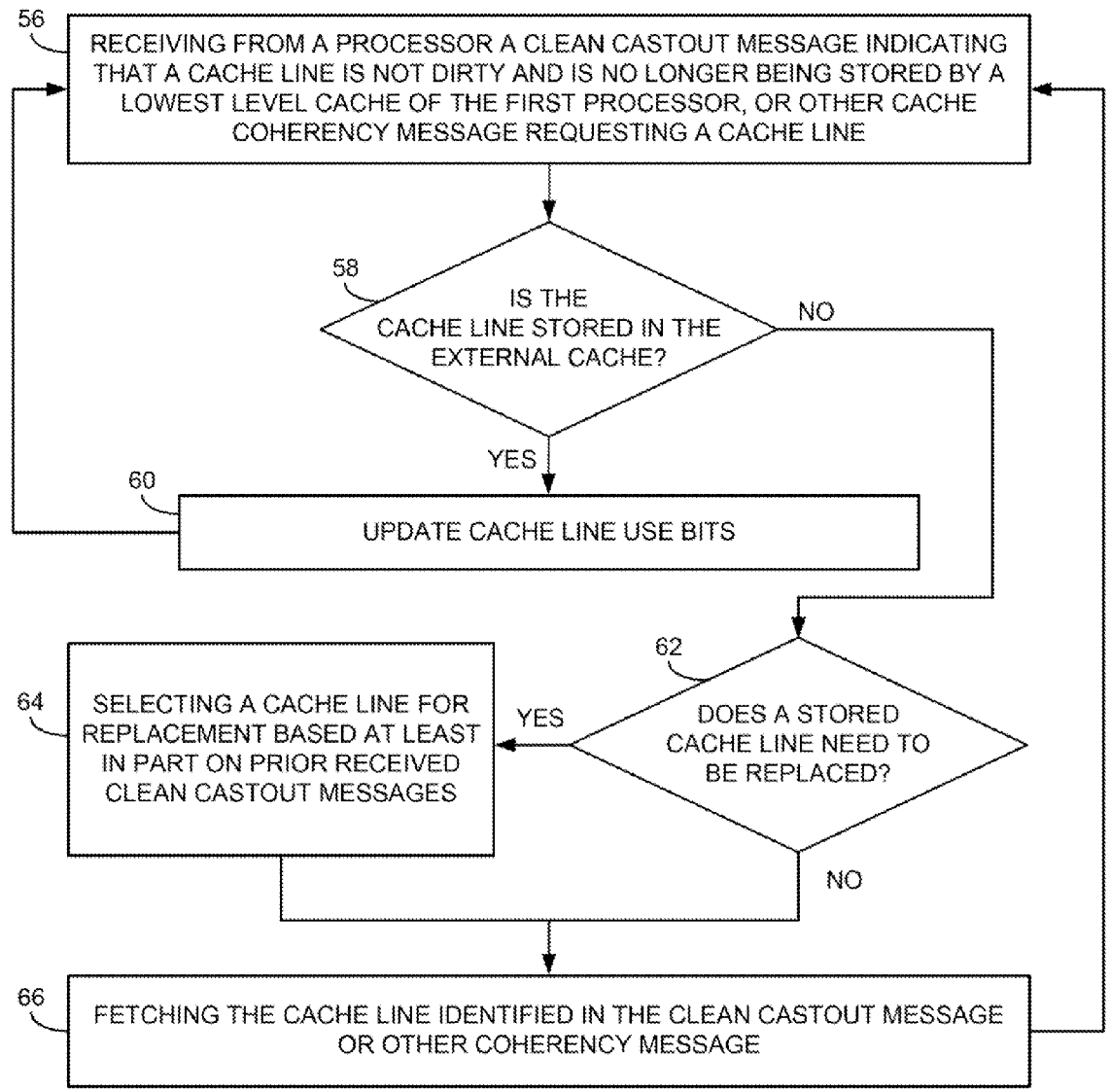
FIG. 6 is a flowchart illustrating an example of external cache operation.

FIG. 6 is a flowchart 54 illustrating an example of external cache operation. At block 56, the external cache receives a message from a processor. The message identifies a cache line, and may be a clean castout message from the processor, or it may be another cache coherency message, such as a read line command sent to several nodes. Control passes to decision block 58.

At decision block 58, the external cache determines whether the external cache is storing the cache line identified at block 56. If the external cache is storing the cache line, the YES branch is taken to block 60, and use bits 38 shown in FIG. 1 are updated to show that the cache line has been used, in accordance with a cache line replacement policy as discussed above. Accordingly, the use bits maintain a clean castout history, with other factors also affecting the use bits in accordance with the implemented cache line replacement policy. Returning to decision block 58, if the external cache is not storing the cache line, the NO branch is taken to decision block 62.

At decision block 62, the external cache determines whether a cache line needs to be replaced. If replacement is needed, the YES branch is taken to block 64, and a cache line is selected for replacement based at least in part on prior received clean castout messages. Control then passes to block 66. Returning to decision block 62, if replacement is not needed, the NO branch is taken to block 66.

At block 66, the cache line that was identified in block 56 is fetched. Control then returns to block 56 to wait for the next message.

The examples disclosed herein provide an external cache mechanism that is well adapted for modern processors that have multiple levels of internal cache memories and integrated main memory controllers. By using clean castout messages to trigger speculative fetches and influence cache line replacement, the examples illustrate an external cache that can also provide benefits traditionally associated with a victim cache.

In the foregoing description, numerous details are set forth to provide an understanding of the examples. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the true spirit and scope of the examples.

What is claimed is:

1. A method of operating an external cache memory comprising:
   receiving from a first processor having an integrated memory controller and multiple levels of cache memory a clean castout message indicating that a first cache line is not dirty and is no longer being stored by a lowest level cache of the first processor;
   determining whether the first cache line is stored in the external cache memory;
   if the first cache line is not stored in the external cache memory, fetching the first cache line into the external cache memory, wherein the external cache memory participates in a cache coherency protocol wherein multiple cache agents can store a shared copy of the first cache line, and only one cache agent can have a forward state associated with its shared copy of the first cache line, and the external cache memory retains the forward state associated with the first cache line as long as the external cache memory stores a shared copy of the first cache line; and
   selecting a second cache line stored in the external cache for replacement based on a clean castout message history associated with the second cache line.

2. The method of claim 1 and further comprising:
   if the first cache line is stored in the external cache, updating a clean castout message history associated with the first cache line.

3. The method of claim 1 wherein the multiple levels of cache memory of the first processor are inclusive.

4. The method of claim 1 wherein cache lines are fetched into the external cache memory based on other cache coherency messages.

5. The method of claim 1 wherein the clean castout message does not include data stored in the first cache line.

6. A computer system comprising:
   a processor having a lowest level cache, a private memory bus, and a point-to-point interconnect bus;
   main memory coupled to the private memory bus; and
   an external cache coupled to the point-to-point interconnect bus and unable to snoop transactions on the private memory bus, the external cache receiving a clean castout message indicating that a first cache line is not dirty and is no longer being stored by the lowest level cache of the processor, the external cache comprising:
      a cache line storage unit;
      a fetch unit that determines, upon receiving the clean castout message, whether the first cache line is stored in the cache line storage unit and fetches the first cache line into the cache line storage unit if the first cache line is not stored in the cache line storage unit; and
      a cache line replacement unit that selects for replacement a cache line stored in the cache line storage unit based on use bits that are updated in response to clean castout messages.

7. The computer system of claim 6 wherein the fetch unit, upon receiving the clean castout message, updates use bits associated with the first cache line if the first cache line is stored in the cache line storage unit.

8. The computer system of claim 6 wherein the lowest level cache is included in multiple inclusive cache levels of the processor.

9. The computer system of claim 6 wherein and further comprising:
   a node controller that couples the external cache to the processor via the point-to-point interconnect bus;
   at least one other processor coupled to the node controller, wherein the processor, the at least one other processor, and the external cache exchange cache coherency messages and the fetch unit fetches cache lines based on the cache coherency messages.

10. The computer system of claim 9 wherein the cache coherency messages are part of a cache coherency protocol wherein multiple cache agents can store a shared copy of the first cache line, and only one cache agent can have a forward state associated with its shared copy of the first cache line, and the external cache retains the forward state associated with the first cache line as long as the external cache memory stores a shared copy of the first cache line.

11. The computer system of claim 6 wherein the clean castout message does not include data stored in the first cache line.

12. A persistent non-transitory storage comprising:
   first logic encodings to receive from a first processor having an integrated memory controller and multiple levels of cache memory, a clean castout message indicating that a first cache line is not dirty and is no longer being stored by a lowest level cache of the first processor;
   second logic encodings to determine whether the first cache line is stored in an external cache memory;
   third logic encodings that, if the first cache line is not stored in the external cache memory, fetch the first cache line into the external cache memory, wherein the external cache memory participates in a cache coherency protocol, wherein multiple cache agents can store a shared copy of the first cache line, and only one cache agent can have a forward state associated with its shared copy of the first cache line;
   fourth logic encodings that retain the forward state associated with the first cache line as long as the external cache memory stores a shared copy of the first cache line; and
   fifth logic encodings to select a second cache line stored in the external cache for replacement based on a clean castout message history associated with the second cache line.

* * * * *